United States Patent [19]

Holling et al.

[11] Patent Number: 5,600,218
[45] Date of Patent: Feb. 4, 1997

[54] SENSORLESS COMMUTATION POSITION DETECTION FOR BRUSHLESS MOTORS

[75] Inventors: George H. Holling, Princeton; Mark M. Yeck; Anthony J. Brewer, both of Madison, all of Wis.

[73] Assignee: George H. Holling, Princeton, Wis.

[21] Appl. No.: 526,525

[22] Filed: Sep. 11, 1995

[51] Int. Cl.$^6$ .................................................. H02P 6/02
[52] U.S. Cl. ........................ 318/439; 318/254; 318/138
[58] Field of Search .................................... 318/138, 245, 318/254, 439, 260–296, 560–696, 699–832; 388/800–824; 360/70–88

[56] References Cited

U.S. PATENT DOCUMENTS

| | | | |
|---|---|---|---|
| 4,780,651 | 10/1988 | Nakano et al. ........................... | 318/254 |
| 4,876,491 | 10/1989 | Squires et al. . | |
| 4,992,710 | 2/1991 | Cassat . | |
| 5,028,852 | 7/1991 | Dunfield . | |
| 5,041,774 | 8/1991 | Komatsu ................................. | 318/727 |
| 5,097,190 | 3/1992 | Lyons et al. . | |
| 5,115,174 | 5/1992 | Masuda et al. . | |
| 5,122,715 | 6/1992 | Kimura et al. ........................... | 318/138 |
| 5,130,620 | 7/1992 | Inaji et al. . | |
| 5,142,208 | 8/1992 | Curran et al. . | |
| 5,144,209 | 9/1992 | Ingji et al. ............................... | 318/254 |
| 5,159,246 | 10/1992 | Ueki . | |
| 5,177,416 | 1/1993 | Inaji et al. ............................... | 318/254 |
| 5,182,499 | 1/1993 | Inaji et al. ............................... | 318/254 |
| 5,191,270 | 3/1993 | McCormack . | |
| 5,204,594 | 4/1993 | Carobolante . | |
| 5,254,914 | 10/1993 | Dunfield et al. . . | |
| 5,254,918 | 10/1993 | Ueki . | |
| 5,287,044 | 2/1994 | Izawa et al. ............................. | 318/254 |
| 5,304,903 | 4/1994 | Nakai et al. ............................. | 318/254 |
| 5,311,105 | 5/1994 | Nakai et al. ............................. | 318/254 |
| 5,319,291 | 6/1994 | Ramirez ................................... | 318/254 |
| 5,327,053 | 7/1994 | Mann et al. . . | |
| 5,469,033 | 11/1995 | Huang ...................................... | 318/439 |
| 5,502,361 | 3/1996 | Moh et al. ............................... | 318/254 |
| 5,532,561 | 7/1996 | Huang ...................................... | 318/439 |

*Primary Examiner*—Paul Ip
*Attorney, Agent, or Firm*—Haugen and Nikolai, PA

[57] ABSTRACT

A method and apparatus for the sensorless determination of commutation position in a brushless motor. The electric current flowing within the active, or energized, stator coil during energization is differentiated to produce a current rate of change waveform. The current rate of change waveform is compared to a predetermined voltage threshold which is set to approximate the point at which the rotor is in direct positional alignment with the active stator. From this comparison, it is determined when the current rate of change waveform fails to intersect the predetermined voltage threshold. This information may be used to commutate the application of a driving signal to the next stator coil in succession to maintain continuous torque on the rotor. This information may also be indicative of a stalled condition, in which case a stall indicator is triggered to alert the user of the stalled condition.

15 Claims, 6 Drawing Sheets

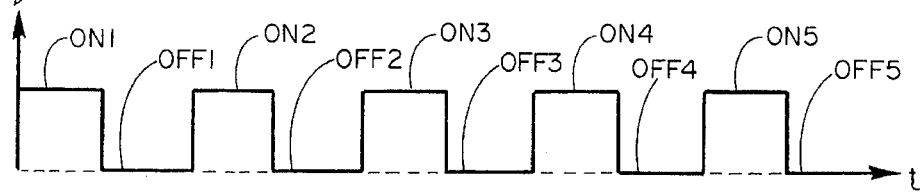
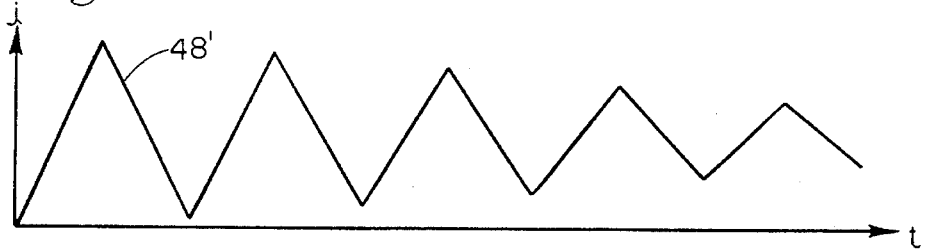
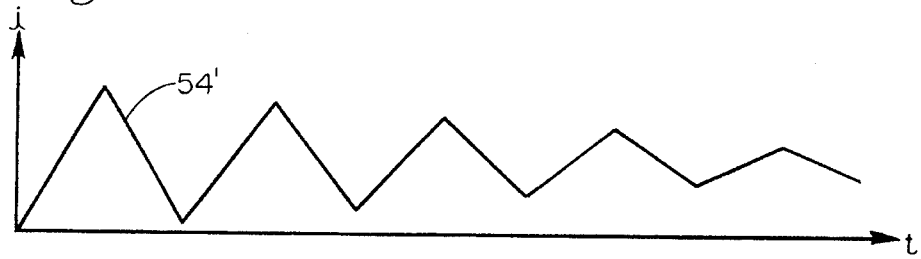
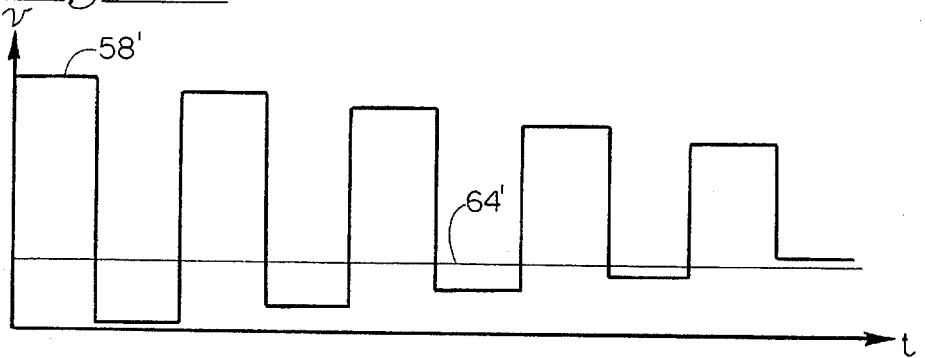
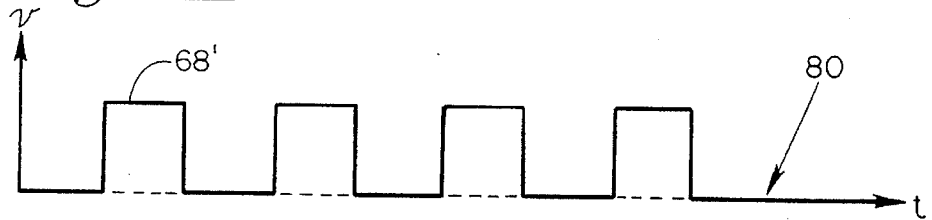

SENSORLESS COMMUTATION POSITION DETECTION FOR BRUSHLESS MOTORS

BACKGROUND OF THE INVENTION

I. Field of the Invention

The present invention relates generally to the field of detecting the commutation position of a rotor within a polyphase brushless motor. More particularly, the present invention is directed to an apparatus and method capable of providing real-time commutation position detection by continuously differentiating the electric current flowing within the active stator coils of a polyphase brushless motor.

II. Discussion of the Related Art

Generally speaking, brushless motors include a rotor and a stator having a plurality of wound field coils. Brushless motors have gained increasing popularity and enjoy a wide array of industrial applications due, in large part, to the fact that brushless motors are electronically commutated, wherein solid-state switching replaces the brushes and segmented commutators of traditional permanent magnet DC motors. The elimination of brushes simplifies motor maintenance as there are no brushes to be serviced or replaced. Furthermore, noise reduction is effectuated because, without brushes, there is no arcing to create electromagnetic interference. The elimination of arcing also minimizes any explosion hazard in the presence of flammable or explosive mixtures. Thus, brushless motors are ideal for use in any setting where sensitive circuitry or hazardous conditions exist or are present.

Brushless motors may be of the variable reluctance, permanent magnet, or hybrid type. Variable reluctance brushless motors are characterized by having an iron core rotor chase sequentially shifting magnetic fields of the stator coils to attract the rotor into rotational motion. Permanent magnet brushless motors are characterized by having the sequentially energized field coils attract or repel a permanent magnet rotor into rotational motion. Hybrid brushless motors, such as stepper motors, are operated by a train of pulses so that their rotors move or are indexed over a carefully controlled fraction of a revolution each time they receive an input step pulse. This permits rotor movement to be controlled with high precision which can be translated into precise rotational or linear movement.

To ensure proper rotational and linear movement in variable reluctance and permanent magnet brushless motors, it is essential to determine the position of the rotor with respect to the energized, or active, stator coils. By knowing this position, referred to as commutation position, the stator coils can be energized in the appropriate sequence to create a revolving magnetic field in the motor to exert the desired rotational or linear torque on the rotor. Traditionally, commutation position is detected by employing one or more transducers within the particular brushless motor to sense the position of the rotor relative to the active stator coil or coils.

However, the use of transducers to determine commutation position has several drawbacks. First, these sensors increase production costs due to the need for sophisticated positional adjustment and increased wiring. Moreover, the space required for commutation position sensors is also a significant disadvantage in that valuable space is consumed within the motor housing. With an ever increasing premium on space and cost efficiency, several attempts have been made to create "sensorless" commutation position feedback systems to replace the need for commutation position sensors within brushless motors.

U.S. Pat. No. 5,327,053 to Mann et al. employs one such "sensorless" technique, wherein the back-EMF voltage in an unenergized stator coil is employed to determine commutation position during motor start-up. This method is based on a proportional relationship, wherein the back-EMF voltage generated in the stator coils during motor operation is a function of motor speed, rotational direction, and commutation position. However, a significant disadvantage exists with this technique in that back-EMF voltage is difficult to reliably measure during the low rotational velocity of the rotor during start up operations. This may prove especially troublesome in applications such as computer disk drive motors, where proper rotational direction at start up is required to avoid damaging disk contents.

U.S. Pat. No. 5,191,270, issued to McCormack represents an attempt to overcome the disadvantages of the back-EMF method. In this technique, "sensorless" commutation detection is performed during the start up phase of operation. An initial measurement is made of the current rise time within each stator coil by applying a known voltage to each stator coil while the rotor is held stationary. A driving current is then supplied to the stator coil which is most nearly aligned with the magnetic field of the rotor so as to move the rotor slightly. A second current rise time measurement is conducted in similar fashion and compared to the initial current rise time measurement. Measurements of initial and second current rise times are analyzed for each stator coil to indicate which stator coil should be energized first to provide proper rotational direction of the rotor at start-up.

A major disadvantage exists, however, in that this method is limited solely to start-up operations. In particular, this method is aimed at determining the rotational direction of a computer disk drive during start-up so as to avoid damaging disk contents from improper rotational direction. To accomplish this, the current rise time within each stator coil is measured at two discrete intervals merely to determine which of the stator field coils should be initially energized to start the rotor in the correct rotational direction. This method, however, does not account for the commutation position of the rotor with respect to the stator field coils continuously throughout the normal, full speed operation of the motor.

Furthermore, this method does not provide an accurate assessment of commutation position. As mentioned above, this method merely measures the current rise times in all stator coils at two discrete points in time, compares these values, and initiates rotation accordingly. By basing the commutation position detection on two discrete measurements, this method must assume certain positional characteristics that cannot be assessed during the interim between current rise time measurements. These assumptions cause this method to be accurate only within one commutation, as opposed to the entire operational cycle. This can be a significant hindrance to proper motor operation because the stator coils cannot be continuously driven in an efficient fashion without an accurate and continuous determination of commutation position.

A further disadvantage of this method is that the determination of commutation position is based upon the absolute value of the current flowing within the motor. By measuring the current rise times within each stator coil at fixed time intervals, this method is highly susceptible to variations or fluctuations in motor speed, motor load, PWM frequency, and bus voltage. For example, an increase in the motor load will require the pulse width of the driving signal to be lengthened to increase the energy supplied to the motor to compensate for the increased load. Such variations in pulse width cause the current rise time measurement to vary in amplitude depending on the load experienced, thereby adversely affecting the accuracy and reliability of the commutation position detection.

Still another drawback of this method is that it requires a substantial amount of processing time to determine commutation position. This results from the need to measure current rise time twice for each stator coil, as well as the subsequent comparisons of the current rise time measurements for each stator coil. For example, a four phase brushless motor employing this method requires eight current rise time measurements, one for each stator coil prior to moving the rotor and one for each stator coil after the rotor has been moved. Each pair of current rise time measurements must then be compared to indicate the relative change in current rise time within each stator coil. Finally, the relative change of current rise time within each stator coil must be compared to indicate which stator coil is positioned closest to the rotor so that the particular stator coil can be commutated to drive the rotor into rotation.

What is needed therefore, is a commutation position detection system which is capable of accurately and continuously assessing commutation position throughout the entire commutation process, rather than merely at start-up. A need also exists for a commutation position detection system that is not dependent on the absolute value of the current flowing within the motor. Still another need exists for a commutation position detection system that is fast and requires minimal processing time.

OBJECTS AND SUMMARY OF THE INVENTION

Accordingly, it is a primary object of the invention to provide an improved method and apparatus for "sensorless" commutation position detection which is capable of reliable, accurate, and continuous commutation position detection throughout the entire operation of the motor.

Another object of the invention is to provide an improved method and apparatus for "sensorless" commutation position detection which operates independent of the absolute value of the current flowing within the motor to reliably and accurately determine commutation position regardless of variations in motor speed and load, PWM frequency, and/or bus voltage.

Yet another object of the present invention is to provide an improved method and apparatus for "sensorless" commutation position detection having minimal data processing time requirements for quickly determining commutation position.

An additional object of the invention is to provide an improved method and apparatus for "sensorless" commutation position detection capable of detecting a stalled condition within the motor.

Thus, in accordance with a broad aspect of the present invention, a method is presented for determining the commutation position of a polyphase brushless motor having a plurality of field coils disposed about a rotor, wherein the field coils have at least one active field coil for receiving a driving signal to generate a magnetic field that exerts the maximum amount of torque on the rotor. The first step in accomplishing such commutation position detection is to selectively energize at least one active field coil with the driving signal, wherein the driving signal comprises a voltage pulse train of successive on and off pulses. Next, the current waveform of the at least one active field coil is continuously monitored during the step of selectively energizing. The current waveform for the at least one active field coil is continuously normalized to define a normalized current waveform. The normalized current waveform is continuously differentiated to define a current rate of change waveform. Finally, the current rate of change waveform is continuously compared to a predetermined voltage threshold value to determine the commutation point, the commutation point being the point in time at which the current rate of change waveform fails to intersect the predetermined voltage threshold.

According to another broad aspect of the present invention, disclosed is a method for commutating a brushless polyphase motor having a rotor and at least one active stator coil, comprising the steps of: (a) applying a driving signal to the at least one active stator coil; (b) normalizing the amount of electric current flowing within the active stator coil during step (a); (c) continuously differentiating the normalized electric current from step (b); and (d) continuously monitoring the normalized electric current from step (c) to determine when the rotor has reached a commutation point.

In yet another broad aspect of the present invention, disclosed is an apparatus for detecting the position of a motor during commutation. This apparatus comprises a brushless motor having a plurality of coils and a rotor and commutation means for generating a driving signal, the commutation signal defining at least one active stator coil from the plurality of stator coils to receive the driving signal. The driving signal is pulsed to successively energize the at least one active stator coil to exert rotational torque on the rotor. Electric current sensing means for sensing the electric current waveform flowing within each of the plurality of coils in response to the stator coil driving signal. Normalization means are provided for normalizing the current flowing within the active stator coil during the application of the driving signal to the active stator coil. Differentiating means are further provided for continuously differentiating the electric current normalized by the normalization means. Comparator means are provided for comparing the electric current differentiated by the differentiating means to a predetermined voltage threshold value. Finally, detection means are provided for detecting a commutation point on the output of the comparator.

According to still another broad aspect of the present invention, disclosed is a method for determining the position of a rotor with respect to a stator coil within a commutation cycle of a polyphase brushless motor, comprising the steps of:(a) energizing the stator coil with a voltage pulse train of sequential on and off pulses; (b) continuously measuring the amount of electric current flowing within the stator coil during step (a); c) continuously differentiating the amount of electric current determined in step (b); and (d) continuously comparing the amount of electric current differentiated in step (c) with a predetermined voltage threshold to identify the rate at which the amount of current differentiated in step (b) intersects a predetermined voltage threshold level.

Other objects and advantages of the invention will become apparent to those skilled in the art in accordance with the descriptions and Figures of this specification.

BRIEF DESCRIPTION OF THE DRAWINGS

In the drawings, wherein like numerals are utilized to designate like parts throughout the same:

FIGS. 4A–4E represent the characteristic commutation position detection waveforms of the embodiment shown in FIG. 2, wherein commutation position is detected by analyzing the current rate of change waveform during each OFF pulse of the commutation cycle;

DETAILED DESCRIPTION

Figure 1:
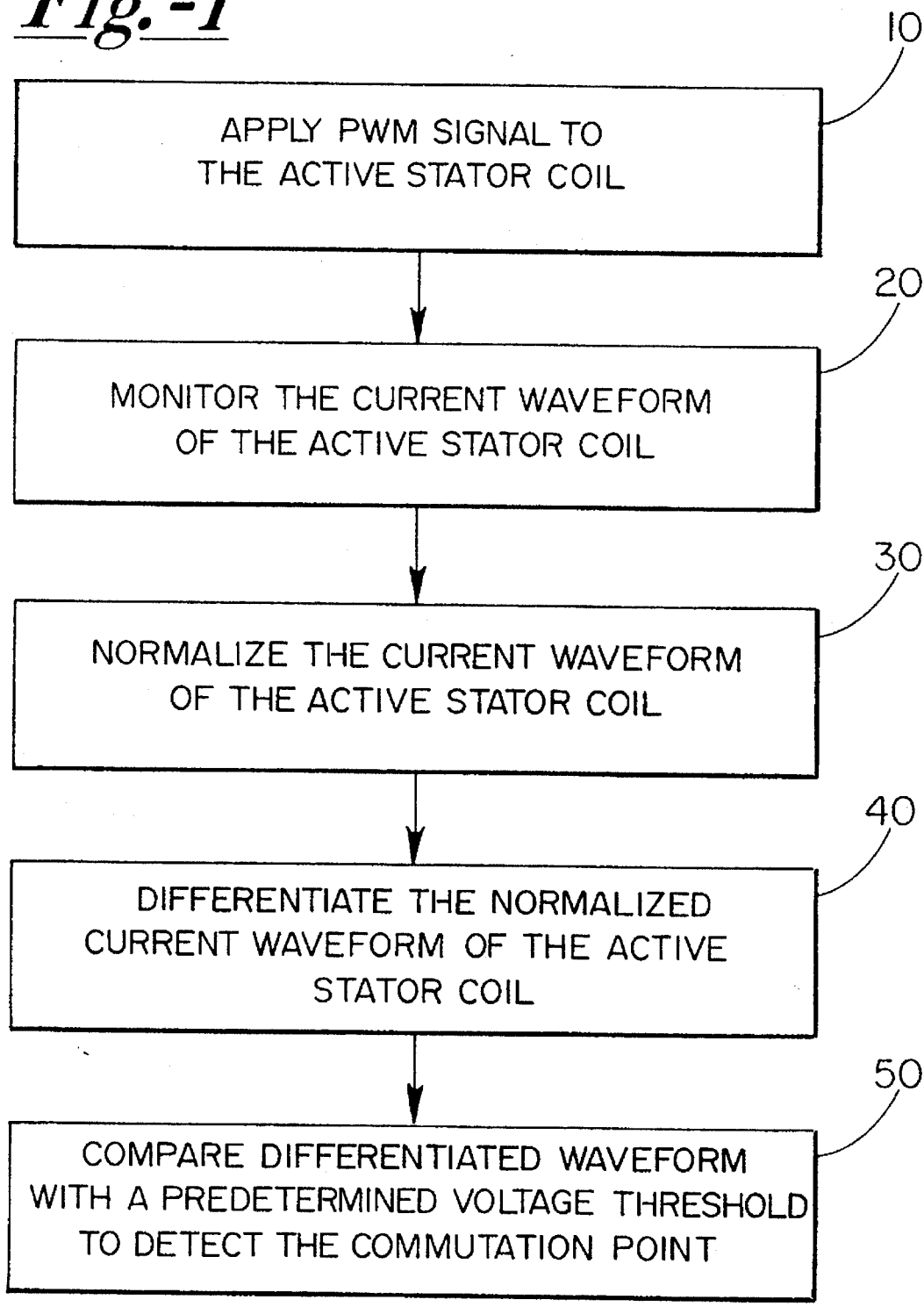
FIG. 1 is a flow chart depicting the fundamental steps in the commutation position detection method of the present invention.

Referring initially to FIG. 1, shown is a flow chart illustrating the fundamental steps in the commutation position detection method of the present invention. This method is inventively capable of continuously and accurately determining the position of the rotor relative to the energized, or active, stator coils within any variety of brushless motor. This real-time position information may be used to sequentially energize, or commutate, the stator coils with a pulse width modulated (PWM) driving signal to generate a revolving magnetic field within the motor to exert optimal rotational and/or linear torque on the rotor.

The first step, 10, requires applying a pulse width modulated (PWM) driving signal to an active stator coil. Active stator coils are those which, due to their relative position to the passing rotor, exert a maximum rotational and/or linear torque on the rotor upon being energized with a PWM driving signal. The next step, 20, entails monitoring the current waveform of the active stator coil. This waveform represents the amount of electric current flowing within the active stator coil as the rotor approaches the active stator coil.

The current waveform is then normalized, in step 30, to remove various extraneous factors that significantly influence the amount of current flowing within the active stator coil, such as fluctuations in motor speed and bus voltage. By removing these influencing factors, the DC component of the current waveform is removed to provide a current waveform comprising only the AC ripple current. It is this AC ripple current that contains the desired commutation position information that is the focus of the present invention. This normalized current waveform is then differentiated in step 40 to produce a current rate of change waveform. The final step, 50, involves comparing the current rate of change waveform with a predetermined voltage threshold to detect point at which the current rate of change waveform stops intersecting the predetermined voltage threshold. The predetermined voltage threshold may be set such that the detection of this point, referred to as the commutation point, is indicative of the position of the rotor relative to the active stator coil.

Figure 2:
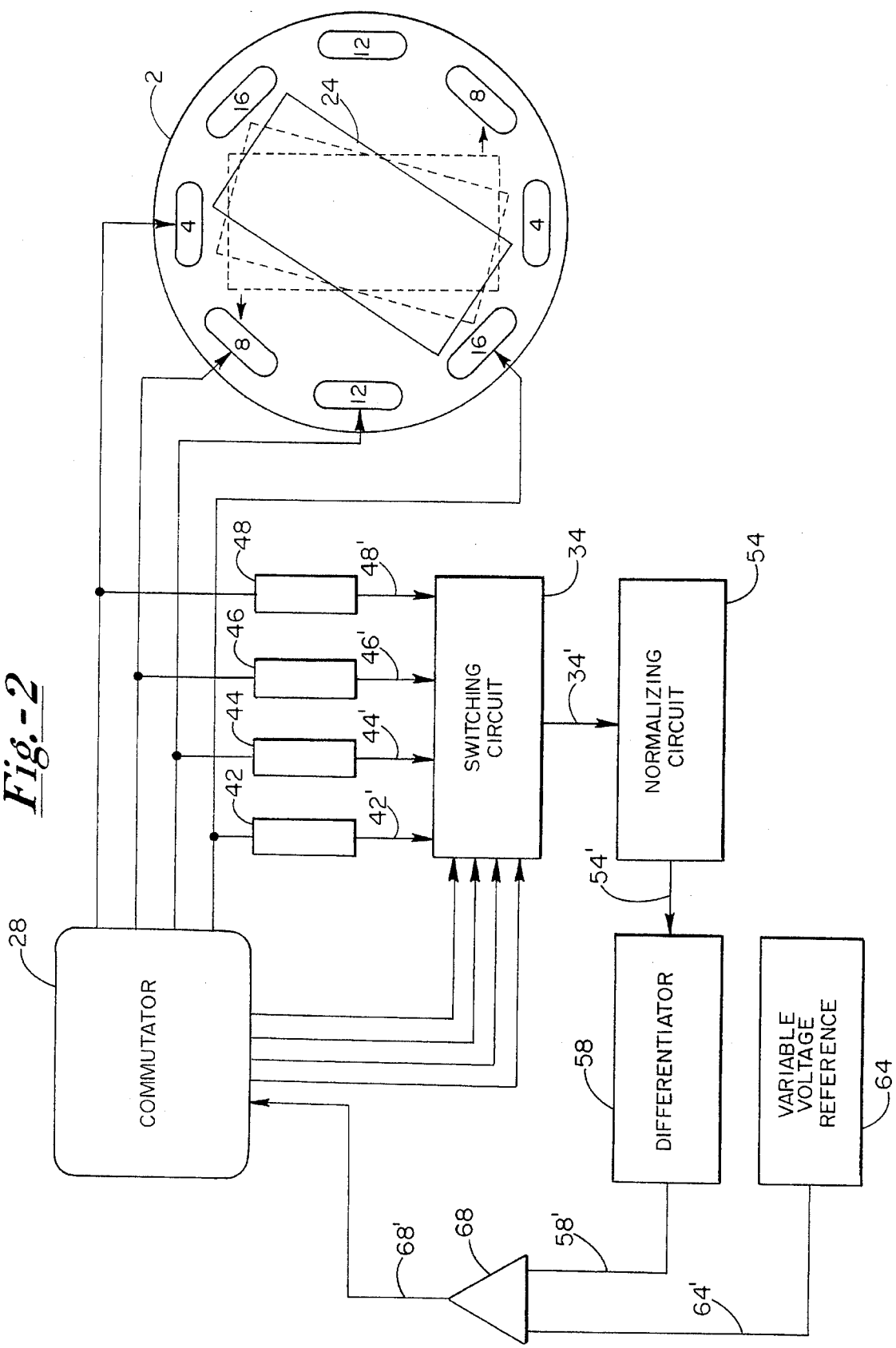
FIG. 2 is a block diagram depicting an exemplary embodiment of the present invention.
Figure 5:
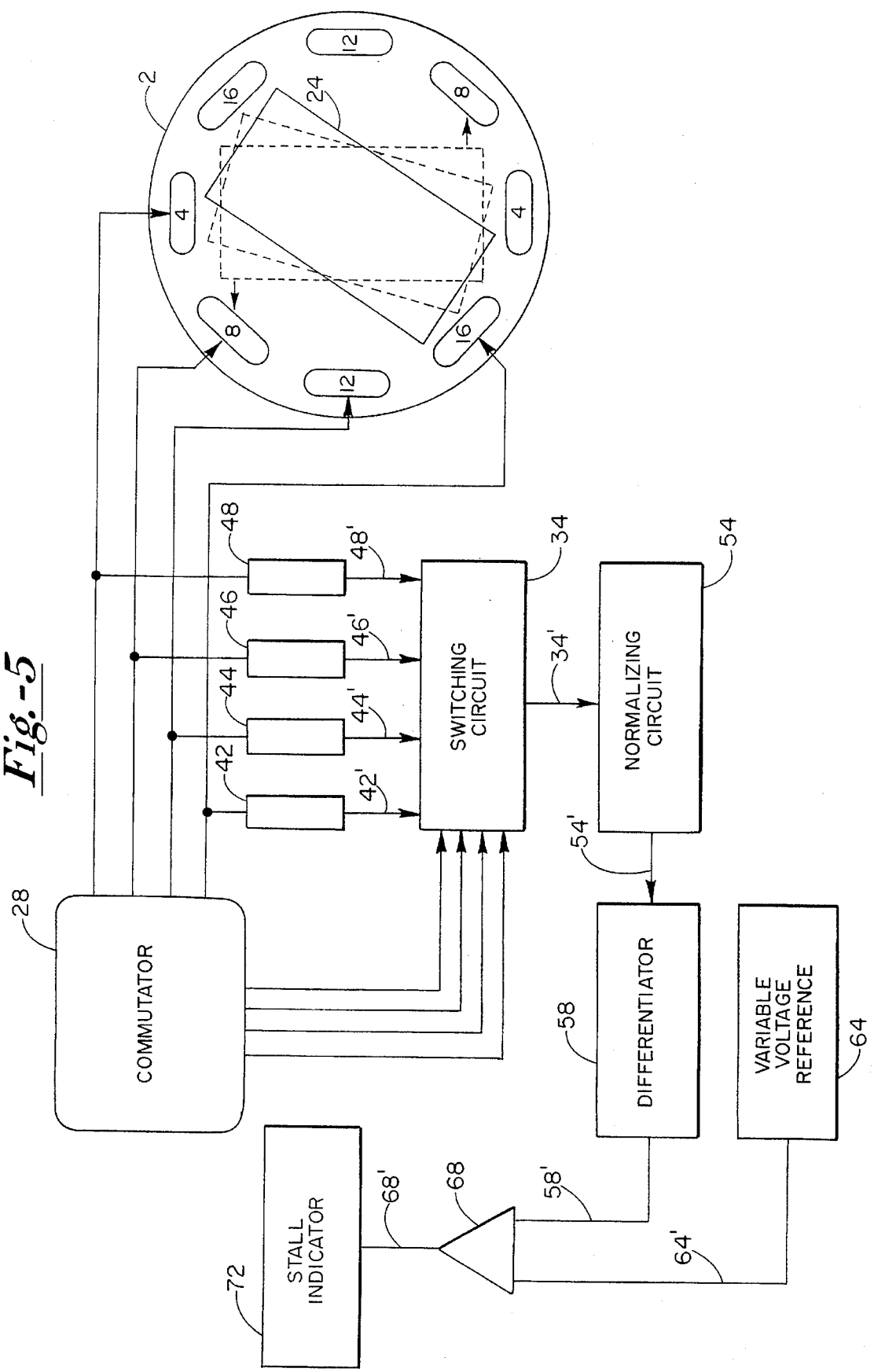
FIG. 5 is yet another exemplary embodiment of the present invention, illustrating a system for detecting a stalled condition within a stepper motor.

By providing this real-time commutation position information in the manner described above, the present invention lends itself to many different applications. By way of example and not limitation, two such applications are described. The first, as shown in FIG. 2, is a system for controlling the sequential commutation of the stator coils of a brushless motor to maintain continuous rotational and/or linear torque on the rotor throughout the entire operation of the motor. The second, as shown in FIG. 5, is a system for detecting a stalled condition within a brushless motor.

Referring first to FIG. 2, shown is a block diagram of one embodiment of the commutation position detection method of the present invention. By way of example and not limitation, this embodiment employs a variable reluctance motor 2 having four stator coils 4, 8, 12, 16 positioned in equi-distant relationship about an internally disposed rotor 24. A commutator 28 is provided for generating and directing a pulse width modulated (PWM) driving signal to selectively energize the appropriate stator coils of motor 2 to maintain rotor 24 in continuous rotation. A plurality of current sensors 42, 44, 46, 48 are provided between commutator 28 and motor 2 to monitor the amount of electric current flowing within stator coils 16, 12, 8, and 4, respectively. Current sensors 42, 44, 46, 48 may be one of several well known current sensing devices, including a current sensing resistor, a current transformer, a Hall-Effect device, or the "on" resistance of a field effect transistor.

The current waveforms detected by current sensors 42, 44, 46, 48 are supplied to a switching circuit 34, which may comprise one of several commercially available switching components. For example, the DG211 analog switch manufactured by Siliconix provides suitable switching capability for the present application. Switching circuit 34 cooperates with commutator 28 to direct the current waveform for the active stator coil to a normalizing circuit 54. Generally speaking, normalizing circuit 54 is provided to remove the DC component of the current flowing within the active stator coil during commutation. This may be accomplished by employing an amplifier having an automated gain control (AGC), wherein the AGC is configured in a negative feedback arrangement to cancel out various extraneous factors that significantly affect the amount of current flowing within the active stator coil. As mentioned above, these influencing factors include fluctuations in bus voltage and motor speed.

By eliminating the effect of such fluctuations, a normalized current waveform is thus produced which consists solely of the AC component of the current flowing within the active stator during commutation. As such, the normalized current waveform is smaller in magnitude than the unprocessed current waveform and does not experience the wide fluctuations that the unprocessed current waveform experiences due to variations in bus voltage or motor load. This allows the commutation position information on the AC ripple current to be more readily and easily determined because, by eliminating the influencing factors that cause fluctuations in the current waveform, it is thus easier to set the predetermined voltage threshold in a position that will indicate the when the rotor comes into direct positional alignment with the active stator. As will be described in greater detail below, setting the predetermined voltage threshold as such will provide a highly accurate indication of the rotor relative to the active stator coil such that the motor can be commutated with great efficiency.

A differentiator 58 is provided to receive and differentiate the normalized current waveform to provide a current rate of change waveform. A comparator 68 is thereafter provided to compare the current rate of change waveform with a predetermined voltage threshold which is set by a variable voltage reference 64. The output of comparator 68 is monitored by commutator 28 to detect a commutation point indicative of the need to apply the PWM driving signal to the next active stator coil.

Figure 3A:
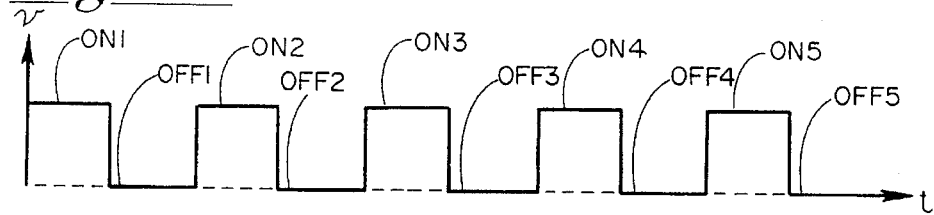
FIG. 3A represents the PWM signal supplied to the active stator coil of FIG. 2 during commutation.

With reference to FIGS. 2 and 3A–3E, commutation position detection during the commutation of stator coil 4 will now be described with particularity. In FIG. 2, stator coil 4 is the active stator coil. This is because the rotational position of rotor 24 within motor 2 is such that the energization of stator coil 4 will generate a magnetic field therewithin that will exert the maximum rotational torque upon rotor 24. Therefore, commutator 28 will direct the PWM driving signal to stator coil 4 until it is determined by the commutation position detection method of the present invention that commutator 28 should commutate to direct the PWM driving signal to stator coil 8. As shown in FIG. 3A, the PWM driving signal comprises a voltage pulse train of sequential ON and OFF pulses. For clarity, each successive ON pulse of the PWM driving signal is designated ON1–ON5, whereas each successive OFF pulse is designated OFF1–OFF5.

Figure 3B:
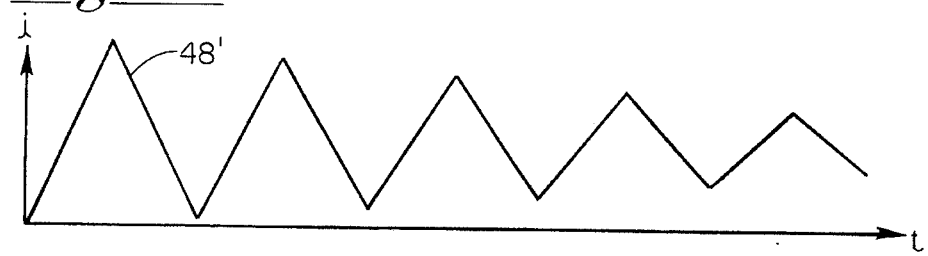
FIG. 3B is the current waveform of the active stator coil of FIG. 2 during commutation.
Figure 3C:
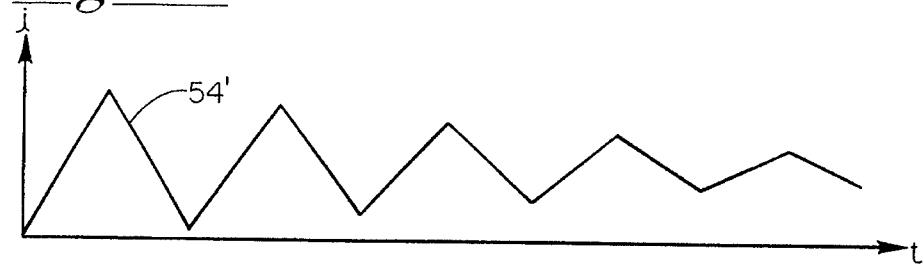
FIG. 3C is the normalized current waveform of the active stator coil of FIG. 2 during commutation.

Turning now to FIG. 3B, shown is the current waveform 48' for the active stator coil 4 as measured by current sensor 48 throughout the entire application of the PWM driving signal. As can be readily examined in FIG. 3B, the current waveform of stator coil 4 experiences a progressive decrease through time with each successive ON and OFF pulse of the PWM driving signal. This relationship can be represented generally by the formula:

$$dI/dT = V/L$$

where:

dI/dT=rate of change of current;

V=voltage applied to active stator coil; and

L=inductance of active stator coil.

Current waveform 48' experiences the progressive decrease shown in FIG. 3B largely due to the fact that the inductance L increases significantly, and in direct proportion, as rotor 24 approaches the active stator coil 4. In terms of the above-equation, the progressive increase of the inductance L causes the dI/dT ratio to progressively decrease, thereby translating into a progressive decrease in the current waveform as rotor 24 approaches the active stator coil 4. The present invention, therefore, accomplishes commutation position detection by focusing on the current rate of change, dI/dT, of the active stator coil during commutation. By doing so, the present invention is not dependent upon the absolute value of the current flowing within the active stator coils. As such, the present invention is capable of being utilized in virtually every type of brushless motor, regardless of the particular current flow characteristics, from computer disk drive to massive industrial brushless motors.

Switching circuit 34 cooperates with commutator 28 to direct the current waveform for the active stator coil to normalizing circuit 54. In this case, with stator coil 4 as the active stator coil, switching circuit 34 passes current waveform 48' to normalizing circuit 54. As mentioned above, normalizing circuit 54 then removes various factors that significantly influence the degree to which current flows within the active stator coil during commutation. This effect can be seen generally with reference to FIG. 3C, wherein the amplitude of the normalized current waveform 54' is smaller than the amplitude of current waveform 48' due to the removal of such influencing factors as fluctuations in bus voltage and motor speed.

Figure 3D:
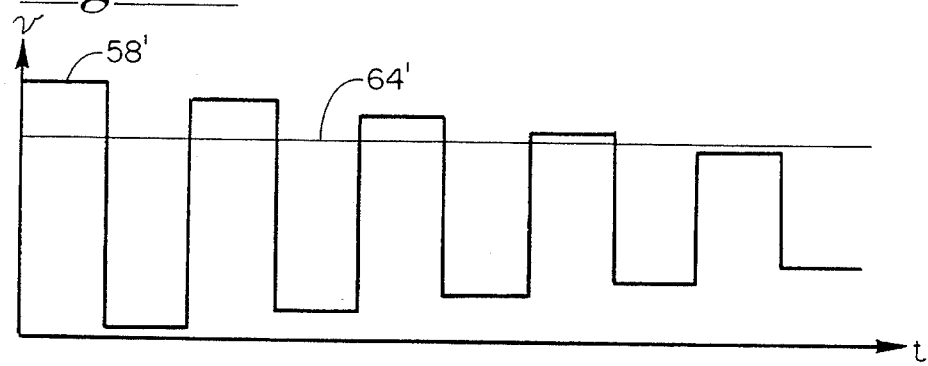
FIG. 3D represents the comparison of the current rate of change waveform of the active stator coil of FIG. 2 with a predetermined voltage threshold.

Normalized current waveform 54' is then differentiated by differentiator 58, resulting in the current rate of change waveform 58' shown in FIG. 3D. Differentiator 58 may comprise one of several readily available differentiating components, such as the TL082 operational amplifier manufactured by, among others, Texas Instruments. It should be noted with particularity that the voltage level of waveform 58' decreases progressively for each successive PWM ON pulse and increases progressively for each successive PWM OFF pulse. Once again, this is due to the fact that the rate of change of the current flowing within the active stator coil 4 (dI/dT) decreases as rotor 24 becomes closer to direct positional alignment with stator coil 4.

Still referring to FIG. 3D, a predetermined voltage threshold 64' is shown superimposed on current rate of change waveform 58'. In the embodiment shown, predetermined voltage threshold 64' is set to detect commutation position based on the amount of current flowing within stator coil 4 during the ON pulses of the PWM driving signal. To do so, predetermined voltage threshold 64' is set at a level slightly above the current rate of change waveform 58' corresponding to the ON5 pulse of the PWM driving signal. Predetermined voltage threshold 64' is set at this level because, as mentioned above, it is at this approximate point where rotor 24 is in closest positional alignment with the active stator coil 4.

As noted above, predetermined voltage threshold 64' is provided by variable voltage reference 64, which may comprise, for example, any number of commercially available variable voltage references. For example, an operational amplifier may be configured with an adjustable potentiometer, as is well known in the art, to provide a manually adjustable variable voltage reference 64. Variable voltage reference 64 may also comprise an amplifier having an automatic gain control (AGC), such as is found in the AD7524 digital-to-analog converter manufactured by Analog Devices, INC., to dynamically set or adjust predetermined voltage threshold 64'. This may be accomplished, for example, by continually tracking the lowest ON pulse voltage plateau for the current rate of change waveform during each commutation cycle. In doing so, this serves as yet another stage of normalization, wherein the position of rotor 24 within each commutation cycle can be effectively determined by analyzing the relative change in current flowing within the active coil during pulses ON1–ON5, as opposed to the absolute change in current flowing within the active coil during pulses ON1–ON5.

Figure 3E:
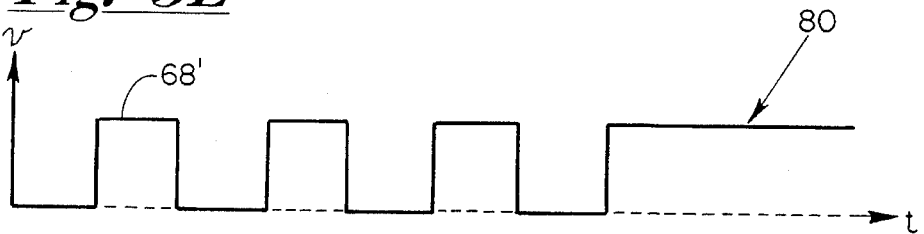
FIG. 3E is the comparator output signal of the comparison shown in FIG. 3D.

Referring now to FIG. 3E, shown is the output signal 68' of comparator 68 during the commutation of stator coil 4. In the present embodiment, comparator 68 is configured to enter a high or conducting state only when current rate of change waveform 58' drops below predetermined voltage threshold 64'. As such, comparator output signal 68' forms a pulse train as long as current rate of change waveform 58' keeps intersecting predetermined voltage threshold 64'. Thereafter, with reference to pulse ON5, comparator output signal 68' remains high. The point in time when comparator output signal 68' remains high is referred to as the commutation point, shown as reference numeral 80 in FIG. 3E. As noted above, predetermined voltage threshold 68' should optimally be set such that commutation point 80 occurs when rotor 24 is in direct positional alignment with the active stator coil 4.

Commutator 28 is configured to continuously monitor comparator output signal 68' to detect the occurrence of commutation point 80. This can be accomplished in one of several well known techniques. For example, digital logic may be employed to compare the PWM driving signal with the comparator output waveform 68' to detect the point at which the two waveform are simultaneously in the high state. With reference to FIGS. 3A, 3D and 3E, this occurs at the onslaught of pulse ON5, wherein current rate of change waveform 58' fails to intersect predetermined voltage threshold 64' thereby causing output waveform 68' to remain in the high state at commutation point 80. When commutation point 80 is detected, commutator 28 then commutates to direct the PWM driving signal to the next active stator coil in motor 2. In the embodiment shown in FIG. 2, commutator 28 would thus be commutated to apply the PWM driving signal to stator coil 8 to re-initiate the commutation position detection process with stator coil 8 as the active stator coil. In so doing, the present invention is capable of continuously determining the commutation position of rotor 24 sequentially commutate the application of the PWM driving signal to stator coils 4, 8, 12, 16 to maintain rotor 24 in continuous rotation.

This invention has been described herein in considerable detail to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

For example, with reference to FIGS. 4A–4E, the present invention is capable of determining commutation position by analyzing the rate of change of the current flowing within the active stator coil 4 (dI/dT) during the successive OFF pulses of the PWM driving signal. With specific reference to FIGS. 4D and 4E, this can be accomplished by setting the predetermined voltage threshold 64' to trigger the comparator 68 based on the OFF pulse voltage plateaus of current rate of change waveform 58'. Preferably, predetermined voltage threshold 64' should be set slightly below the current rate of change waveform 58' at a point corresponding to pulse OFF5, as it is during this time when rotor 24 is closest to direct positional alignment with the active stator coil 4. With predetermined voltage threshold 64' set as such, comparator 68 will generate the voltage pulse train until waveform 58' fails to intersect the predetermined voltage threshold 64'. As shown in FIGS. 4D and 4E, the failure of current rate of change waveform 58' to intersect predetermined voltage threshold 64' will cause the output waveform 68' of the comparator 68 to remain in a low state at commutation point 80. As mentioned above, commutator 28 is configured to detect the occurrence of the commutation point 80 to commutate to apply the PWM driving signal to the next active stator coil.

With reference now to FIG. 5, shown is a block diagram of yet another example of that which is contemplated by the present invention. In this embodiment, the method of the present invention is modified slightly to provide a stall detector for brushless motors. The motor provided in this embodiment is a stepper motor 2 having a plurality of stator coils 4, 8, 12, 16 disposed in equi-distant relationship about an internally disposed rotor 24. A stall indicator 72 is provided to receive the output signal 68' of the comparator 68. With these exceptions, all functional blocks of this embodiment are identical to those shown in FIG. 2 and, accordingly, a description thereof will not be repeated. It is significant to note, however, the operation of the present embodiment with reference to FIGS. 6A–6E.

Figure 6A:
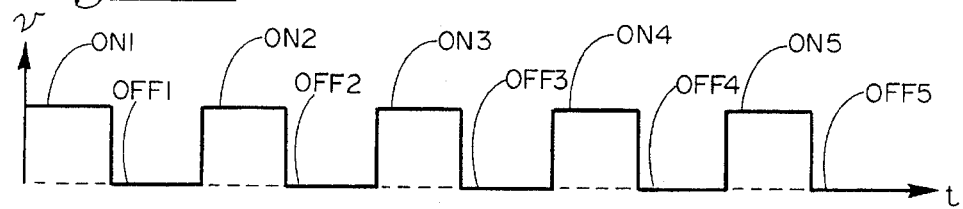
FIG. 6A is the PWM signal supplied to the active stator coil of FIG. 5 during commutation.
Figure 6B:
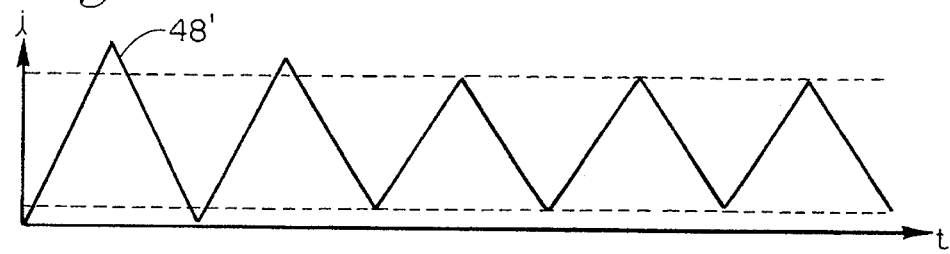
FIG. 6B is the current waveform of the active stator coil of FIG. 5 during commutation.
Figure 6C:
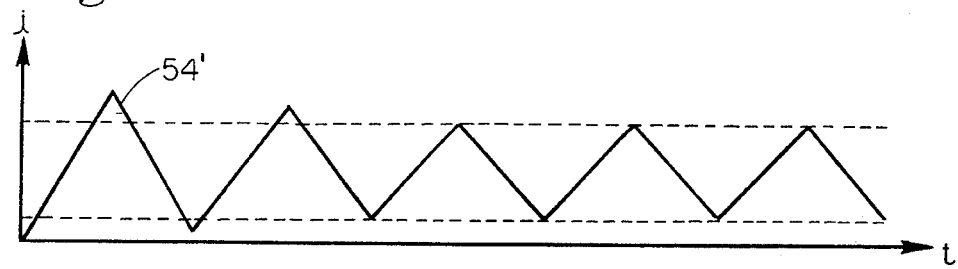
FIG. 6C is the normalized current waveform of the active stator coil of FIG. 5 during commutation.
Figure 6D:
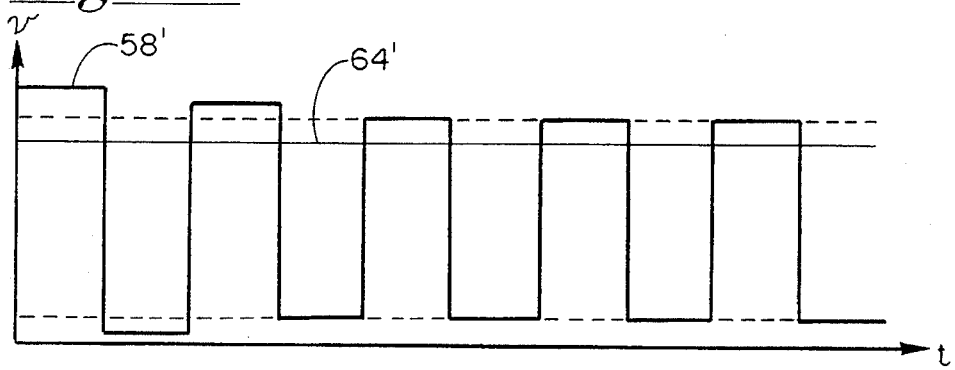
FIG. 6D represents the comparison of the current rate of change waveform of the active stator coil of FIG. 5 with a predetermined voltage threshold.

Turning first to FIG. 6B, illustrated is the current waveform 48' flowing within the active stator coil 4 during commutation. As is readily apparent, the slope (dI/dT) of the current waveform 48' remains constant following pulse OFF2, as shown in dashed lines. Under normal operating conditions, this dI/dT would ordinarily decrease through time as rotor 24 approaches the active stator coil 4. However, in this case, the constant slope (dI/dT) of the current waveform 48' indicates a stalled condition following pulse OFF2. This, in turn, translates into a stalled condition appearing on the normalized current waveform 54' shown in dashed lines in FIG. 6C, which, when differentiated, produces a constant amplitude on the current rate of change waveform 58' following pulse OFF2, as shown in dashed lines in FIG. 6D. The predetermined voltage threshold 64' is set such much in the same fashion as in the embodiment shown in FIG. 2, being positioned so as to trigger the comparator 68 based on the ON pulse voltage plateaus of the current rate of change waveform 58'.

Figure 6E:
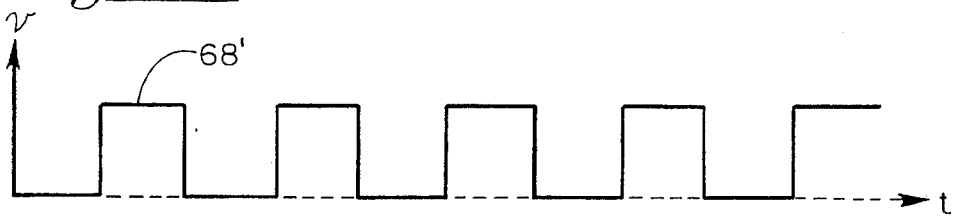
FIG. 6E is the comparator output signal of the comparison illustrated in FIG. 6D.

However, as viewed in FIG. 6E, the output signal 68' of comparator 68 does not stop intersecting the predetermined voltage threshold 68' due to the stalled condition of rotor 24 within the commutation of active stator coil 4. Stall indicator 72 is capable of detecting the failure of current rate of change waveform 58' to stop intersecting predetermined voltage threshold 64'. Stall indicator 72 is also capable of alerting a user of the stalled condition upon such detection. Stall indicator 72 may comprise any number of well known circuits to perform these functions. For example, a light emitting diode (LED) may be employed in conjunction with common digital logic to illuminate the LED when it is determined that the current rate of change waveform 58' persists in intersecting the predetermined voltage threshold 64' throughout the entire commutation of active stator coil 4.

It is also to be understood that, for certain applications, the normalization process of the present invention need not be employed to determine commutation position. As mentioned above, the normalization step is performed to remove various extraneous factors which significantly affect the rate of change of the current (dI/dT) flowing within the active stator coil. Therefore, applications that do not experience such fluctuations may not require normalization provided above. In particular, these applications include those having constant motor speed and constant bus voltage. By maintaining the bus voltage and motor speed at a constant level, the significant variations in current rate of change that normally result from fluctuations in bus voltage and motor speed are eliminated. As such, the present invention is capable of determining commutation position, in certain applications, without performing the aforementioned normalization.

Finally, it is to be understood that motor 2 may have greater or fewer than the number of stator coils shown in FIGS. 2 and 5 without departing from the scope of the invention. Moreover, any type of brushless motor may be implemented in accordance with the present invention, including variable reluctance, permanent magnet, and stepper motors.

What is claimed is:

1. A method for determining a commutation position of a polyphase brushless motor having a plurality of field coils disposed about a rotor, said plurality of field coils having at least one active field coil for receiving a driving signal to generate a magnetic field that exerts the maximum amount of torque on said rotor, comprising the steps of:

(a) selectively energizing said at least one active field coil with said driving signal, said driving signal comprising a voltage pulse train of successive on and off pulses;

(b) continuously monitoring the current waveform of said at least one active field coil during said step of selectively energizing;

(c) continuously normalizing said current waveform to define a normalized current waveform;

(d) continuously differentiating said normalized current waveform to define a current rate of change waveform; and (e) continuously comparing said current rate of change waveform to a predetermined voltage threshold value to determine the commutation point, said commutation point being the point in time at which said current rate of change waveform fails to intersect said predetermined voltage threshold.

2. The method as set forth in claim 1 and further wherein said step (c) comprises the step of:

determining the average amount of electric current flowing within said active field coil during said step of selectively energizing; and subtracting said average amount of electric current from said current waveform.

3. The method as set forth in claim 2 wherein said step (e) comprises the steps of:

providing means for adjustably setting said predetermined voltage threshold value;

setting said means for adjustably setting at a voltage level such that said commutation point corresponds to the approximate point in time at which said rotor is in direct positional alignment with said at least one active field coil.

4. The method as set forth in claim 3 wherein said step of setting said means for adjustably setting comprises the further step of setting said predetermined voltage threshold value to determine commutation position during said successive on pulses of said driving signal.

5. A method for commutating a brushless polyphase motor having a rotor and at least one active stator coil, comprising the steps of:

(a) applying a driving signal to said at least one active stator coil;

(b) normalizing said amount of electric current flowing within said active stator coil during step (a);

(c) continuously differentiating the normalized electric current from step (b); and (d) continuously monitoring the normalized electric current from step (c) to determine when said rotor has reached a commutation point.

6. The method set forth in claim 5 and further wherein step (d) comprises the substeps of:

(i) setting a predetermined voltage threshold value;

(ii) comparing said electric current differentiated in step (c) with said predetermined voltage threshold value; and (iii) determining when said electric current differentiated in step (c) stops intersecting said predetermined voltage threshold value.

7. The method set forth in claim 6 comprising the further step of:

(e) commutatingly switching to apply said driving signal to a stator coil positioned adjacent to said at least one active stator coil when said amount of current differentiated in step (c) fails to intersect said predetermined voltage threshold value.

8. The method set forth in claim 7 and further wherein step (e)(i) comprises the further steps of:

(a) providing a digital to analog converter; and (b) dynamically selecting said predetermined voltage threshold value with said digital to analog converter.

9. The method set forth in claim 7 and further wherein step (e)(i) comprises the steps of:

(a) providing a potentiometer connected to a reference voltage; and (b) manually adjusting said potentiometer to set said predetermined voltage threshold value.

10. An apparatus for detecting a position of a commutator of a motor during commutation, comprising:

a brushless motor having a plurality of coils and a rotor;

commutation means for generating a driving signal, said commutation signal defining at least one active stator coil from said plurality of stator coils to receive said driving signal, said driving signal being pulsed to successively energize said at least one active stator coil to exert rotational torque on the rotor;

electric current sensing means for sensing the electric current waveform flowing within each of said plurality of coils in response to said stator coil driving signal;

normalization means for normalizing the current flowing within said active stator coil during the application of said stator coil driving signal to said active stator coil;

differentiating means for continuously differentiating the electric current normalized by said normalization means;

comparator means for comparing the electric current differentiated by said differentiating means to a predetermined voltage threshold value; and detection means for detecting a commutation point on the output of said comparator.

11. The apparatus as set forth in claim 10 and further, comprising:

a variable voltage reference for generating said predetermined voltage threshold level;

said electric current sensing means comprising one of a current sensing resistor, a current transformer, a Hall effect current sensor, and the "on" resistance of a field effect transistor;

wherein said commutation means commutates to apply said driving signal to a stator coil disposed on one side of each said at least one active stator coil when said detection means detects the occurrence of said commutation point on said output of said comparator.

12. A method for determining a position of a rotor with respect to a stator coil within a commutation cycle of a polyphase brushless motor, comprising the steps of:

(a) energizing said stator coil with a voltage pulse train of sequential on and off pulses;

(b) continuously measuring the amount of electric current flowing within said stator coil during step (a);

(c) continuously differentiating the amount of electric current determined in step (b);

(d) continuously comparing the amount of electric current differentiated in step (c) with a predetermined voltage threshold to identify the rate at which the amount of current differentiated in step (b) intersects a predetermined voltage threshold level.

13. The method as set forth in claim 12 and further, wherein step (b) includes the further step of continuously normalizing the amount of electric current flowing within said stator coil during step (a).

14. The method as set forth in claim 13 and further, wherein step (d) includes the substeps:

(i) providing means for adjustably setting said predetermined voltage threshold value; and (ii) setting said means for adjustably setting at a voltage level that corresponds to the approximate point in time at which said rotor is in direct positional alignment with said at least one active field coil.

15. The method as set forth in claim 14 wherein said step of setting said means for adjustably setting comprises the further step of setting said predetermined voltage threshold value to determine commutation position during said successive on pulses of said driving signal.

* * * * *